(12) United States Patent
Brushaber

(10) Patent No.: US 7,527,454 B1
(45) Date of Patent: May 5, 2009

(54) MARINE FENDER

(76) Inventor: Donald Brushaber, 221 Hayes Ct., Normandy Beach, NJ (US) 08739

( * ) Notice: Subject to any disclaimer, the term of this patent is extended or adjusted under 35 U.S.C. 154(b) by 0 days.

(21) Appl. No.: 12/176,685

(22) Filed: Jul. 21, 2008

(51) Int. Cl.
*E02B 3/28* (2006.01)
(52) U.S. Cl. .................. 405/215; 405/212; 114/219; 267/140
(58) Field of Classification Search ............. 405/212, 405/215; 114/219; 267/139, 140
See application file for complete search history.

(56) References Cited

U.S. PATENT DOCUMENTS

| | | | |
|---|---|---|---|
| 3,169,756 A | | 2/1965 | Miller |
| 3,179,397 A | * | 4/1965 | Cleereman et al. .......... 267/140 |
| 3,820,495 A | * | 6/1974 | Ueda ........................... 405/215 |
| 4,055,136 A | * | 10/1977 | Fujisawa et al. ............ 114/219 |
| 5,031,564 A | | 7/1991 | Beckerer, Jr. |
| 5,269,248 A | | 12/1993 | Lee |
| 5,762,016 A | | 6/1998 | Parsons |
| 6,289,836 B1 | | 9/2001 | Tellex |
| 6,685,395 B1 | | 2/2004 | Busby |

\* cited by examiner

*Primary Examiner*—Frederick L Lagman
(74) *Attorney, Agent, or Firm*—Arthur Jacob

(57) ABSTRACT

A marine fender for protecting a marine structure and watercraft against damage from collision forces. The marine fender includes an elongate body of resilient material having a basal wall dimensioned and configured for mounting the marine fender on the marine structure, and an outer wall for being engaged by a collision force, the basal wall and the outer wall defining an inner space. A web within the inner space is integral with the basal wall and with the outer wall, and has a generally M-shaped lateral cross-sectional configuration enabling cushioning by the outer wall and establishing an integral reinforcing and energy absorbing construction within the inner space for protecting against damage to the marine structure from collision forces exerted against the outer wall, as well as against damage to the watercraft.

17 Claims, 4 Drawing Sheets

MARINE FENDER

The present invention relates generally to the protection of marine structures and watercraft from damage due to collision forces and pertains, more specifically, to marine fenders for use in connection with boat docks, piers, pilings, wharfs and the like to absorb and dissipate energy generated by impacts and other forces which can occur upon a watercraft striking a marine structure.

Boating has become increasingly popular as more and varied watercraft have been made available to a greater number of people seeking to enjoy time on the water. A concomitant increase in boating traffic has given rise to a greater need for the protection of marine structures, such as boat docks, pilings and piers, as well as the myriad of watercraft themselves, from damage resulting from collisions between a watercraft and a marine structure, whether inadvertent or due to mooring arrangements. While there are available many different marine fenders, these currently available marine fenders include complex structural features and costly materials which render the marine fenders more expensive to manufacture and more difficult to install, or which are lacking in adequate performance, especially over a long term.

The present invention provides an improved marine fender which overcomes the inadequacies of currently available marine fenders and, as such, attains several objects and advantages, some of which are summarized as follows: Makes available for widespread use a marine fender constructed for ready attachment to any one of a variety of marine structures, such as boat docks, piers, pilings and wharfs, for improved protection against damage due to forces resulting from collisions between watercraft and such marine structures; provides a marine fender with an improved, unique internal reinforcing construction which permits cushioning to protect against relatively light bumping forces and presents an aesthetically pleasing and simple external appearance while enabling internal resistance to greater impacts and other heavier forces encountered at marine structures and mooring facilities; employs specific internal structural reinforcing elements placed and oriented within a marine fender to reinforce against particular forces encountered at marine structures and to effectively absorb and dissipate such forces; facilitates the installation of an effective marine fender in any one of a variety of locations and orientations to accommodate a variety of sites for increased versatility and more widespread adoption; utilizes simplified manufacturing techniques and relatively less expensive materials for reduced cost, while assuring effective performance; provides a marine fender constructed for economical manufacture and exemplary performance over a long service life.

The above objects and advantages, as well as further objects and advantages, are attained by the present invention which may be described briefly as a marine fender for attachment to a marine structure to protect against damage from collision forces at the marine structure, the marine fender comprising: an elongate body of resilient material of indeterminate longitudinal length, the body including: a basal wall for mounting the body upon the marine structure, the basal wall having a basal mounting surface dimensioned and configured for engaging the marine structure; an outer wall integral with the basal wall at transversely spaced apart intersections between the outer wall and the basal wall, the outer wall extending laterally outwardly away from the basal wall to establish an inner space between the outer wall and the basal wall, at least a portion of the outer wall following an outwardly curved contour configuration, with the inner space enabling laterally inward resilient flexure of the outer wall in response to collision forces exerted against the outer wall; a web within the inner space, the web being integral with the basal wall and with the outer wall, and having a generally M-shaped lateral cross-sectional configuration, the M-shaped lateral cross-sectional configuration including a pair of lateral legs spaced apart transversely, each leg extending laterally between a basal end integral with the basal wall and an apical end integral with the outer wall, an intermediate arm extending from each apical end toward the basal wall, intermediate the lateral legs, each intermediate arm extending at an angle to a corresponding lateral leg, such that the intermediate arms converge toward and are integrated with the basal wall intermediate the lateral legs, whereby the web establishes an integral reinforcing, energy absorbing and dissipating construction within the inner space for protecting against damage from the collision forces exerted against the outer wall.

The invention will be understood more fully, while still further objects and advantages will become apparent, in the following detailed description of preferred embodiments of the invention illustrated in the accompanying drawing, in which.

Figure 1:
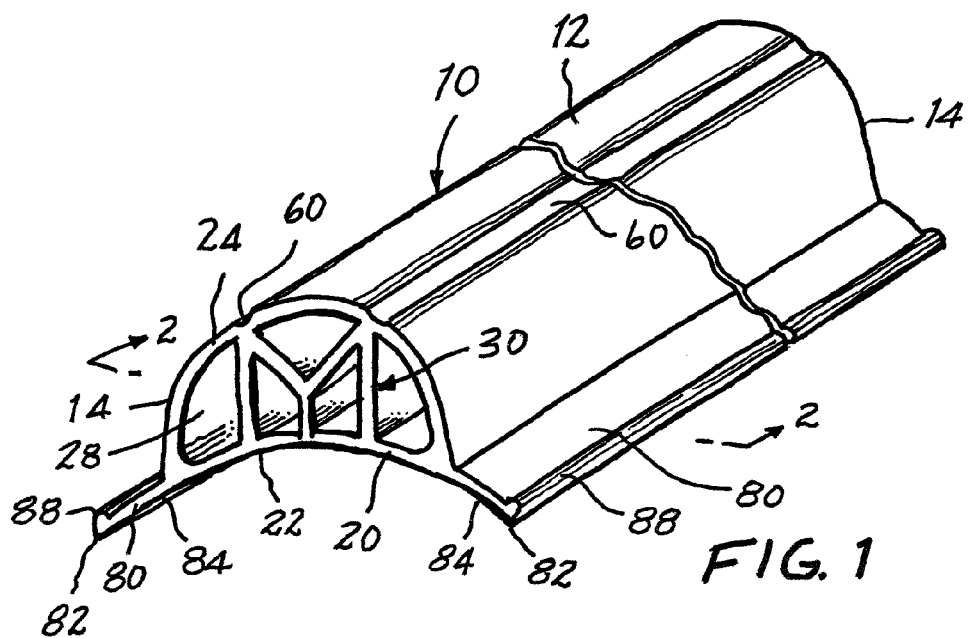
FIG. 1 is an isometric end, top and side view of a marine fender constructed in accordance with the present invention.
Figure 2:
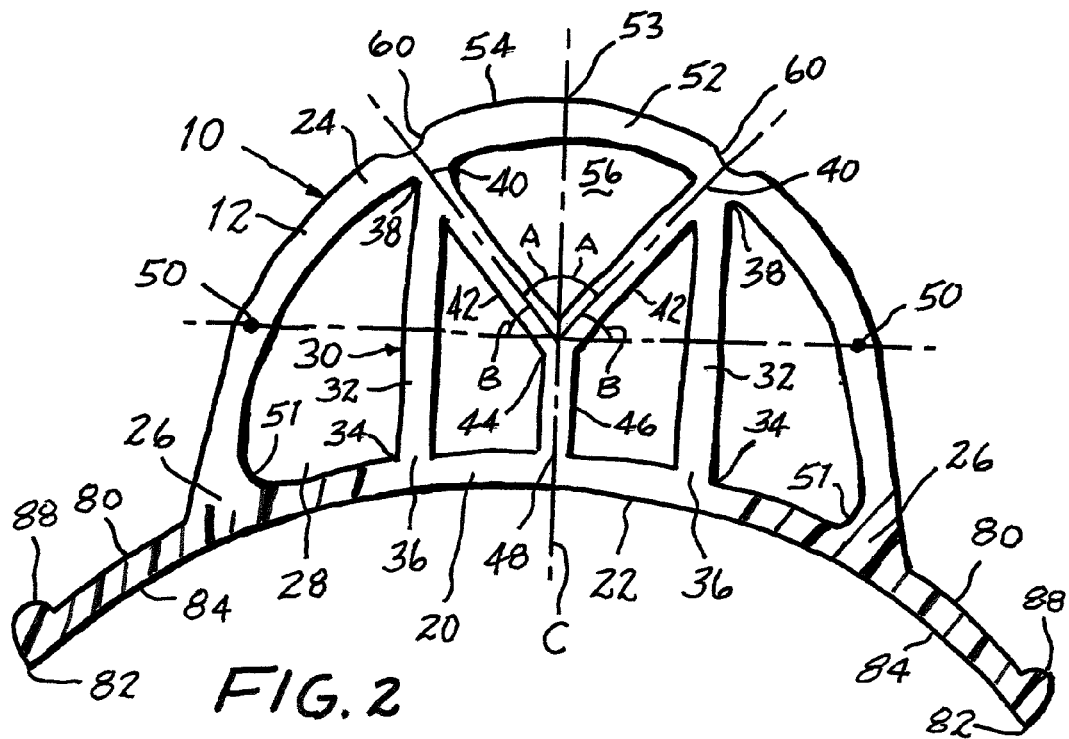
FIG. 2 is a enlarged lateral cross-sectional view taken along line 2-2 of FIG. 1, with some crosshatching deleted for clarity.

Referring now to the drawing, and especially to FIGS. 1 and 2 thereof, a marine fender constructed in accordance with the present invention is illustrated at 10 and is seen to have an elongate body 12 of indeterminate longitudinal length extending between opposite ends 14. Body 12 includes a basal wall 20 having a basal mounting surface 22 dimensioned and configured for engaging a marine structure, as will be described below. An outer wall 24 is integral with basal wall 20 at transversely spaced apart intersections 26 between the outer wall 24 and the basal wall 20 and extends laterally outwardly away from the basal wall 20 to establish an inner space 28 between the outer wall 24 and the basal wall 20. A reinforcing web 30 lies within the inner space 28 and preferably extends continuously along the length of body 12 from one to the other end 14.

Web 30 is integral with basal wall 20 and with outer wall 24 and has a generally M-shaped lateral cross-sectional configuration including a pair of lateral legs 32 spaced apart transversely, each leg 32 extending laterally between a basal end 34 integral with the basal wall 20 at a corresponding basal intersection 36, and an apical end 38 integral with the outer wall 24 at a corresponding apical intersection 40. An intermediate arm 42 extends from each apical end 38 toward the basal wall 20, intermediate the lateral legs 32, each arm 42 being integral with the outer wall 24 and with a corresponding leg 32 at the corresponding apical intersection 40. The arms 42 each extend at an angle to a corresponding leg 32 so as to converge in the direction toward the basal wall 20 and preferably intersect at an intermediate intersection 44 located essentially midway between the legs 32 and spaced a relatively short lateral distance outwardly away from the basal wall 20. A relatively short intermediate lateral leg 46 extends in a lateral direction from the intersection 44 to the basal wall 20 and is integral with the basal wall 20 at an intermediate intersection 48 located essentially midway between the basal intersections 36. In the preferred configuration, the two lateral legs 32 extend in directions essentially parallel to one another, and the lateral leg 46 extends in a direction essentially parallel to the two lateral legs 32 such that all three lateral legs 32 and 46 extend in essentially parallel lateral directions.

Outer wall 24 follows an outwardly bowed, convex curved configuration, at least between apical intersections 40, and preferably beyond apical intersections 40 to points 50. Between each point 50 and a corresponding intersection 26 the outer wall 24 preferably follows an essentially straight line, and a fillet 51 is placed within inner space 28 at each intersection 26 for providing stress relief to militate against tearing of body 12 at each intersection 26. The outwardly curved configuration preferably follows an arcuate configuration, at least between the apical intersections 40, thereby providing an arcuate segment 52 along crown 53 of the outer surface 54 of the outer wall 24, which crown 53 extends along a portion 56 of inner space 28 that lies between the intermediate arms 42. Thus, light bumping forces which may impinge upon the crown 53 of the outer wall 24, along arcuate segment 52, are absorbed readily and their energy effectively dissipated through flexure and inward movement of the arcuate segment 52. Such flexure, inward movement and energy dissipation is facilitated by the converging arrangement of the intermediate arms 42 which, together with intermediate lateral leg 46, establishes a reinforcing and energy dissipating generally Y-shaped lateral cross-sectional configuration, and is enhanced by providing the outer surface 54 with groove-like relief depressions 60 juxtaposed with the apical ends 38 of the intermediate arms 42, and with intersections 40, and extending longitudinally along the body 12 from one to the other end 14. Upon removal of any impinging force, segment 52 will return to the illustrated arcuate configuration by virtue of the resilient nature of the material of body 12 acting in concert with the aforesaid structural features.

In the preferred embodiment of marine fender 10, the lateral cross-sectional configuration of body 12 is symmetrical about a centerline C, arcuate segment 52 extends along an angular distance of about 45° to either side of the centerline C, and intermediate arms 42 extend along respective directions making an angle of about 45° to either side of centerline C, all as depicted in FIG. 2 by angles A. The curved configuration continues beyond segment 52 by about further 45° angles, as depicted by angles B. Thus, outer wall 24 is reinforced against collision forces of greater magnitude and against forces applied at various angles to the centerline C by the essentially parallel lateral legs 32 acting in concert with the generally Y-shaped cross-sectional configuration of the angled intermediate arms 42 and the intermediate lateral leg 46 to resist forces impinging upon the outer wall 24 in essentially any angular direction and at essentially any location along the outer wall 24. In this manner, the M-shaped lateral cross-sectional configuration of web 30, coupled with the outwardly bowed configuration of the outer wall 24 and the stress relief provided by fillets 51, establishes a highly effective resiliently yielding resistance to such forces, while absorbing and dissipating the energy of these forces, thereby providing exemplary protection against damage to a marine structure, as well as to a colliding watercraft, as will be set forth below.

Figure 3:
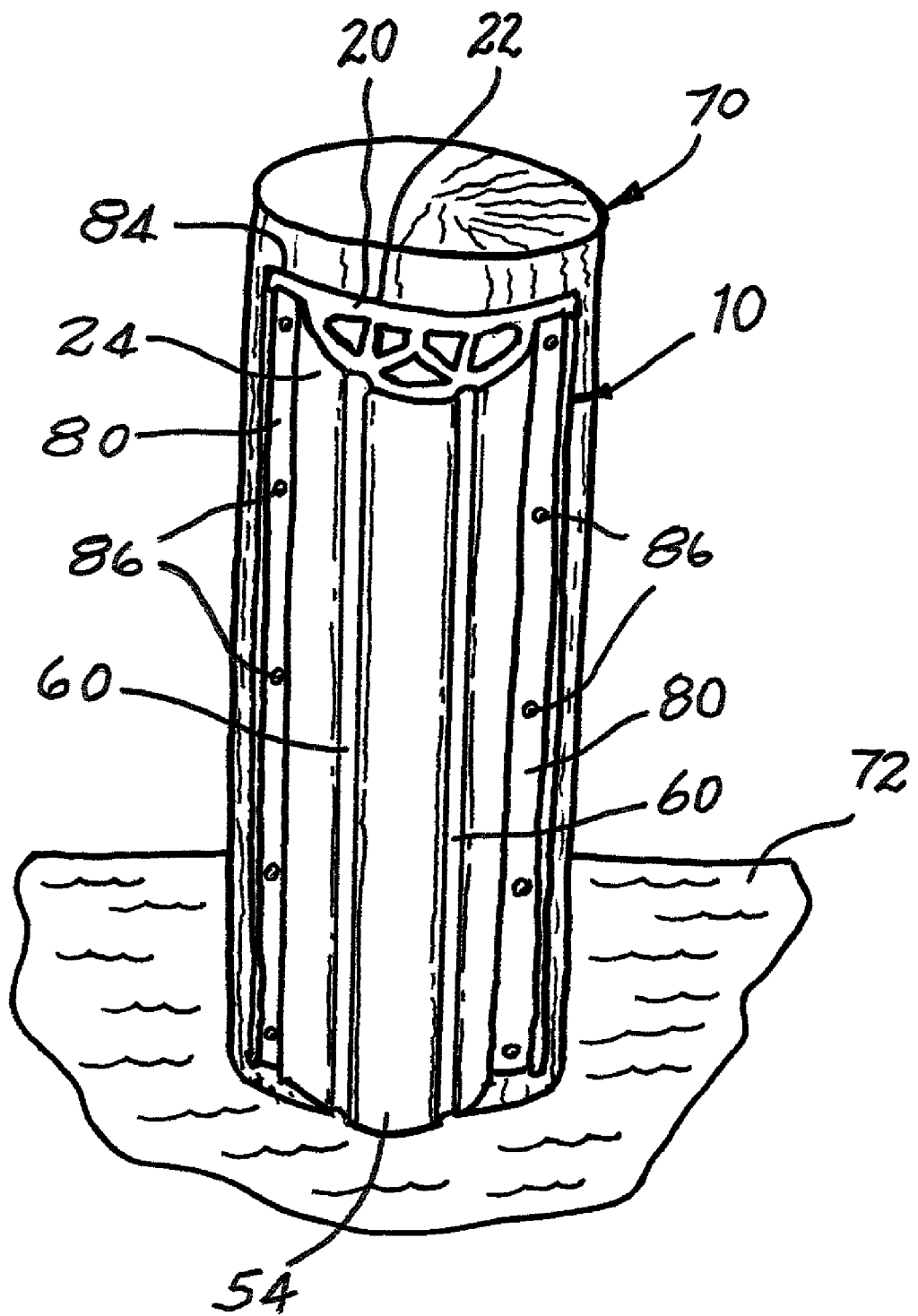
FIG. 3 is a pictorial view showing the marine fender installed on a marine structure.

Turning now to FIG. 3, a marine structure is illustrated in the form of a generally cylindrical piling 70 which extends vertically upwardly out of surrounding water 72 in a conventional manner. In order to protect the piling 70 against damage which could occur should a watercraft (not shown) collide with the piling 70, as well as to protect the watercraft itself against damage, a marine fender 10 has been installed on the piling 70. To that end, and with reference also to FIGS. 1 and 2, marine fender 10 is provided with flanges 80 which extend longitudinally along the basal wall 20, juxtaposed with respective intersections 26 from one to the other end 14, and which project outwardly transversely away from the respective intersections 26, each to a terminal edge 82. Flanges 80 are dimensioned and configured for facilitating attachment of the marine fender 10 to the generally cylindrical configuration of the piling 70, that is, each flange 80 includes a flange mounting surface 84 which follows a concave curved contour configuration. Likewise, the basal mounting surface 22 is curved so that together, the flange mounting surfaces 84 and the basal mounting surface 22 present a concave curved contour configuration capable of being fitted readily to the piling 70, the curved contour configuration extending essentially continuously along the basal mounting surface 22 and the flange mounting surfaces 84 from one terminal edge 82 to the transversely opposite terminal edge 82. Installation of the marine fender 10 is accomplished merely by fitting the body 12 of the marine fender 10 to the piling 70, as seen in FIG. 3, and inserting fasteners 86, in the form of nails or screws, through flanges 80 and into piling 70 to attach the marine fender 10 to the piling 70. Each flange 80 is provided with a bead 88 extending longitudinally along a corresponding terminal edge 82 for militating against tearing of the flange 80 at the terminal edge 82.

The construction of marine fender 10 lends itself to simplified manufacturing techniques utilizing economical materials. Synthetic polymeric materials are available for providing requisite resilient characteristics, as well as properties which render the materials amenable to manufacture by extrusion. A preferred material which exhibits appropriate resilient qualities, as well as sufficient resistance to corrosion to serve as a marine fender, and which lends itself readily to extrusion techniques, is polyvinylchloride (PVC). Thus, marine fender 10 is manufactured readily and is made available economically in suitable longitudinal lengths through extrusion of PVC in indeterminate lengths, readily cut to size to serve at a variety of marine structure sites. Manufacture by extrusion renders all of the structural elements of marine fender 10 not only integral with one another, but fully unitary in a versatile, relatively high strength completed construction.

Figure 4:
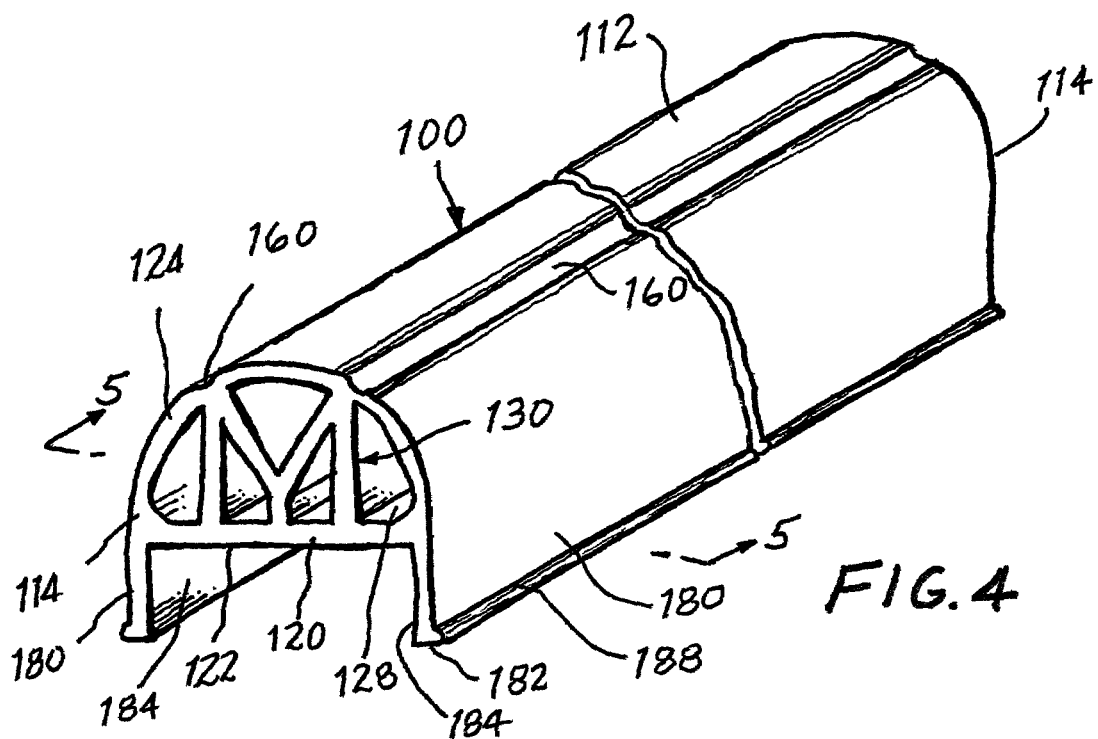
FIG. 4 is an isometric end, top and side view of another marine fender constructed in accordance with the present invention.
Figure 5:
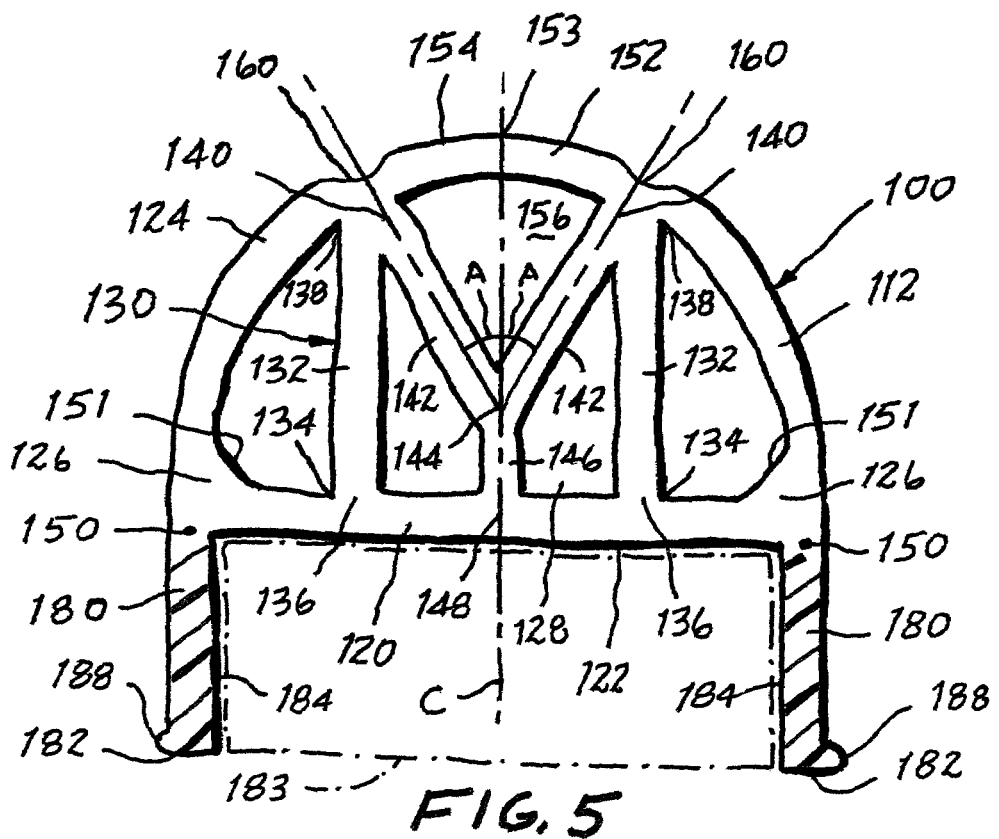
FIG. 5 is an enlarged lateral cross-sectional view taken along line 5-5 of FIG. 4, with some crosshatching deleted for clarity.
Figure 6:
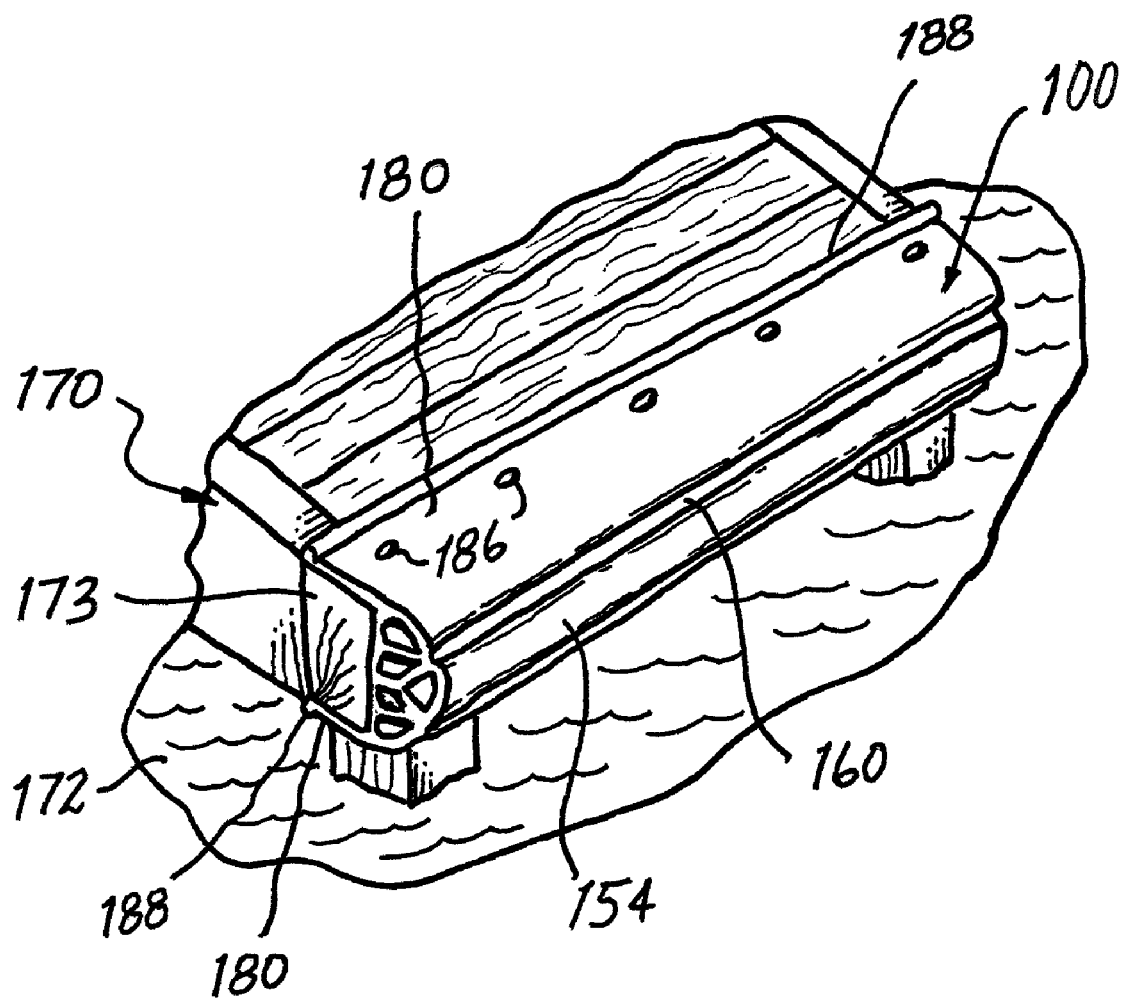
FIG. 6 is a pictorial view showing the marine fender of FIG. 4 installed on a marine structure.

Referring now to FIGS. 4 through 6, another marine fender constructed in accordance with the present invention is illustrated at 100 and is seen to have an elongate body 112 of indeterminate longitudinal length extending between opposite ends 114. Body 112 includes a basal wall 120 having a basal mounting surface 122 dimensioned and configured for engaging a marine structure, as will be described below. An outer wall 124 is integral with basal wall 120 at transversely spaced apart intersections 126 between the outer wall 124 and the basal wall 120 and extends laterally outwardly away from the basal wall 120 to establish an inner space 128 between the outer wall 124 and the basal wall 120. A reinforcing web 130 lies within the inner space 128 and preferably extends continuously along the length of body 112 from one to the other end 114.

Web 130 is integral with basal wall 120 and with outer wall 124 and has a generally M-shaped lateral cross-sectional configuration including a pair of lateral legs 132 spaced apart transversely, each leg 132 extending laterally between a basal end 134 integral with the basal wall 120 at a corresponding basal intersection 136, and an apical end 138 integral with the outer wall 124 at a corresponding apical intersection 140. An intermediate arm 142 extends from each apical end 138 toward the basal wall 120, intermediate the lateral legs 132, each arm 142 being integral with the outer wall 124 and with a corresponding leg 132 at the corresponding apical intersection 140. The arms 142 each extend at an angle to a corresponding leg 132 so as to converge in the direction toward the basal wall 120 and preferably intersect at an intermediate intersection 144 located essentially midway between the legs 132 and spaced a relatively short lateral distance outwardly away from the basal wall 120. A relatively short intermediate lateral leg 146 extends in a lateral direction from the intersection 144 to the basal wall 120 and is integral with the basal wall 120 at an intermediate intersection 148 located essentially midway between the basal intersections 136. In the preferred configuration, the two lateral legs 132 extend in directions essentially parallel to one another, and the lateral leg 146 extends in a direction essentially parallel to the two lateral legs 132 such that all three lateral legs 132 and 146 extend in essentially parallel lateral directions.

Outer wall 124 follows an outwardly bowed, convex curved configuration, at least between apical intersections 140, and preferably beyond apical intersections 140 to points 150. A fillet 151 is placed within inner space 128 at each intersection 126 for providing stress relief to militate against tearing of body 112 at each intersection 126. The outwardly curved configuration preferably follows an arcuate configuration, at least between the apical intersections 140, thereby providing an arcuate segment 152 along crown 153 of the outer surface 154 of the outer wall 124, which crown 153 extends along a portion 156 of inner space 128 that lies between the intermediate arms 142. Thus, light bumping forces which may impinge upon the crown 153 of the outer wall 124, along arcuate segment 152, are absorbed readily and their energy effectively dissipated through flexure and inward movement of the arcuate segment 152. Such flexure, inward movement and energy dissipation is facilitated by the converging arrangement of the intermediate arms 142, together with intermediate lateral leg 146, establishing a reinforcing and energy dissipating generally Y-shaped lateral cross-sectional configuration, and is enhanced by providing the outer surface 154 with groove-like relief depressions 160 juxtaposed with the apical ends 138 of the intermediate arms 142, and with intersections 140, and extending longitudinally along the body 112 from one to the other end 114. Upon removal of any impinging force, segment 152 will return to the illustrated arcuate configuration by virtue of the resilient nature of the material of body 112 acting in concert with the aforesaid structural features.

In the preferred embodiment of marine fender 110, the lateral cross-sectional configuration of body 112 is symmetrical about a centerline C, arcuate segment 152 extends along an angular distance of about 45° to either side of the centerline C, and intermediate arms 142 extend along respective directions making an angle of about 45° to either side of centerline C, all as depicted in FIG. 5 by angles A. The curved configuration continues beyond segment 152 to intersections 126. Thus, outer wall 124 is reinforced against collision forces of greater magnitude and against forces applied at various angles to the centerline C by the essentially parallel lateral legs 132 acting in concert with the generally Y-shaped cross-sectional configuration of the angled intermediate arms 142 and the intermediate lateral leg 146 to resist forces impinging upon the outer wall 124 in essentially any angular direction and at essentially any location along the outer wall 124. In this manner, the M-shaped lateral cross-sectional configuration of web 130, coupled with the outwardly bowed configuration of the outer wall 124 and the stress relief provided by fillets 151, establishes a highly effective resiliently yielding resistance to such forces, while absorbing and dissipating the energy of these forces, thereby providing exemplary protection against damage to a marine structure, as well as to a colliding watercraft, as will be set forth below.

With particular reference now to FIG. 6, a marine structure is illustrated in the form of a boat dock 170 which extends horizontally along surrounding water 172 in a conventional manner. In order to protect the boat dock 170 against damage which could occur should a watercraft (not shown) collide with the boat dock 170, as well as to protect the watercraft itself against damage, a marine fender 110 has been installed on a horizontal structural member 173 of the dock 170. To that end, and with reference also to FIGS. 4 and 5, marine fender 110 is provided with flanges 180 which extend in longitudinal directions along basal wall 120, juxtaposed with respective intersections 126, from one to the other end 114, and which project outwardly in lateral directions away from the respective intersections 126, each to a terminal edge 182. Flanges 180 are dimensioned and configured for facilitating attachment of the marine fender 110 to the configuration of the structural member 173 which, in this instance, presents a rectangular cross-sectional configuration of standard dimensioned lumber, such as a standard "two-by-four," as shown in phantom at 183 in FIG. 5. Accordingly, each flange 180 includes a flange mounting surface 184 which follows a generally planar configuration complementary to a corresponding side of the rectangular cross-sectional configuration 183. Basal mounting surface 122 is essentially planar and flange mounting surfaces 184 extend in a direction essentially normal to basal mounting surface 122 so that together, the flange mounting surfaces 184 and the basal mounting surface 122 establish a partially rectangular contour configuration capable of being fitted readily to the structural member 173, with the rectangular cross-sectional configuration of the structural member 173 nested within the confines of the basal mounting surface 122 and the flange mounting surfaces 184. Installation of the marine fender 110 is accomplished merely by fitting the body 112 of the marine fender 110 to the structural member 173, as seen in FIG. 6, and inserting fasteners 186, in the form of nails or screws, through flanges 180 and into structural member 173 to attach the marine fender 110 to the boat dock 170. Each flange 180 is provided with a bead 188 extending longitudinally along a corresponding terminal edge 182 for militating against tearing of the flange 180 at the terminal edge 182.

As described above in connection with the manufacture and use of marine fender 10, marine fender 110 is manufactured readily and is made available economically in suitable longitudinal lengths through extrusion of PVC in indeterminate lengths, readily cut to size for simple and economical installation.

It will be seen that the present invention attains all of the objects and advantages summarized above, namely: Makes available for widespread use a marine fender constructed for ready attachment to any one of a variety of marine structures, such as boat docks, piers, pilings and wharfs, for improved protection against damage due to forces resulting from collisions between watercraft and such marine structures; provides a marine fender with an improved, unique internal reinforcing construction which permits cushioning to protect against relatively light bumping forces and presents an aesthetically pleasing and simple external appearance while enabling internal resistance to greater impacts and other heavier forces encountered at marine structures and mooring facilities; employs specific internal structural reinforcing elements placed and oriented within a marine fender to reinforce against particular forces encountered at marine structures and to effectively absorb and dissipate such forces; facilitates the installation of an effective marine fender in any one of a variety of locations and orientations to accommodate a variety of sites for increased versatility and more widespread adoption; utilizes simplified manufacturing techniques and relatively less expensive materials for reduced cost, while assuring effective performance; provides a marine fender constructed for economical manufacture and exemplary performance over a long service life.

It is to be understood that the above detailed description of preferred embodiments of the invention are provided by way of example only. Various details of design and construction may be modified without departing from the true spirit and scope of the invention as set forth in the appended claims.

The embodiments of the invention in which an exclusive property or privilege is claims are defined as follows:

1. A marine fender for attachment to a marine structure to protect against damage from collision forces at the marine structure, the marine fender comprising:
   an elongate body of resilient material of indeterminate longitudinal length, the body including:
   a basal wall for mounting the body upon the marine structure, the basal wall having a basal mounting surface dimensioned and configured for engaging the marine structure;
   an outer wall integral with the basal wall at transversely spaced apart intersections between the outer wall and the basal wall, the outer wall extending laterally outwardly away from the basal wall to establish an inner space between the outer wall and the basal wall, at least a portion of the outer wall following an outwardly curved contour configuration, with the inner space enabling laterally inward resilient flexure of the outer wall in response to collision forces exerted against the outer wall;
   a web within the inner space, the web being integral with the basal wall and with the outer wall, and having a generally M-shaped lateral cross-sectional configuration, the M-shaped lateral cross-sectional configuration including a pair of lateral legs spaced apart transversely, each leg extending laterally between a basal end integral with the basal wall and an apical end integral with the outer wall, an intermediate arm extending from each apical end toward the basal wall, intermediate the lateral legs, each intermediate arm extending at an angle to a corresponding lateral leg, such that the intermediate arms converge toward and are integrated with the basal wall intermediate the lateral legs, whereby the web establishes an integral reinforcing, energy absorbing and dissipating construction within the inner space for protecting against damage from the collision forces exerted against the outer wall.

2. The marine fender of claim 1 wherein the outwardly curved contour configuration of the outer wall follows an arcuate configuration, at least between the apical ends of the lateral legs.

3. The marine fender of claim 1 wherein the intermediate arms intersect at an intermediate intersection located about midway between the lateral legs.

4. The marine fender of claim 3 wherein the lateral legs extend essentially parallel to one another.

5. The marine fender of claim 3 wherein the intermediate intersection is spaced laterally outwardly away from the basal wall, and the M-shaped lateral cross-sectional configuration includes an intermediate lateral leg extending laterally from the intermediate intersection to the basal wall such that the intermediate arms and the intermediate lateral leg establish an essentially Y-shaped lateral cross-sectional configuration.

6. The marine fender of claim 5 wherein the lateral legs extend essentially parallel to one another.

7. The marine fender of claim 1 wherein the basal wall includes a flange projecting beyond each intersection between the outer wall and the basal wall, to a terminal edge spaced from each intersection, the flanges being dimensioned and configured for attachment to the marine structure.

8. The marine fender of claim 7 wherein the basal mounting surface follows a concave curved contour configuration and the flanges each include a flange mounting surface following the concave curved contour configuration.

9. The marine fender of claim 7 wherein the basal mounting surface follows an essentially planar configuration and the flanges each include essentially planar flange mounting surfaces extending at an angle to the basal mounting surface.

10. The marine fender of claim 9 wherein the flange mounting surfaces extend essentially normal to the basal mounting surface.

11. The marine fender of claim 7 wherein each flange includes a bead extending longitudinally along a corresponding terminal edge for militating against tearing of the flange at the terminal edge.

12. The marine fender of claim 7 including a fillet within the inner space, juxtaposed with each intersection between the outer wall and the basal wall for militating against tearing of the body at each intersection.

13. The marine fender of claim 1 wherein the outer wall includes an outer surface and a relief depression extending longitudinally along the outer surface in juxtaposition with the apical end of each lateral leg for facilitating flexure and inward movement of the outer wall in response to a collision force exerted upon the outer surface.

14. The marine fender of claim 1 including a fillet within the inner space, juxtaposed with each intersection between the outer wall and the basal wall for militating against tearing of the body at each intersection.

15. The marine fender of claim 1 wherein the basal wall, the outer wall and the reinforcing web comprise a unitary structure constructed of a resilient synthetic polymeric material.

16. The marine fender of claim 15 wherein the unitary structure comprises an extruded synthetic polymeric material.

17. The marine fender of claim 16 wherein the synthetic polymeric material is PVC.

* * * * *